UNITED STATES PATENT OFFICE.

PAUL JULIUS, OF LUDWIGSHAFEN, GERMANY, ASSIGNOR TO BADISCHE ANILIN AND SODA FABRIK, OF LUDWIGSHAFEN, GERMANY.

BROWN-VIOLET AZO DYE.

SPECIFICATION forming part of Letters Patent No. 710,059, dated September 30, 1902.

Application filed July 1, 1902. Serial No. 114,002. (No specimens.)

*To all whom it may concern:*

Be it known that I, PAUL JULIUS, doctor of philosophy and chemist, a subject of the Emperor of Austria-Hungary, residing at Ludwigshafen-on-the-Rhine, in the Kingdom of Bavaria, Germany, have invented new and useful Improvements in Azo Coloring-Matter, of which the following is a specification.

I have discovered that when 1-chlor-2-naphthylamin-5-sulfo-acid, or what is equivalent for the purposes of this invention 2-naphthylamin-1.5-disulfo-acid, is diazotized and the diazo compound treated with a suitable weak alkaline agent—such as sodium carbonate, sodium acetate, and the like—for a sufficient length of time a new diazo compound results which does not combine with beta-naphthol at 0° centigrade, (or at most combines with great difficulty,) but does combine with it on warming the reaction liquid to, say, 50° centigrade, then yielding a new and valuable blue coloring-matter which dyes wool brown-violet shades. The shade produced with coloring-matter equal to one per cent. of the weight of the wool dyed becomes on treatment with a potassium-bichromate solution which has been acidulated with acetic acid a blackish blue, while the shade produced with three per cent. of coloring-matter becomes on treatment with potassium bichromate and acetic acid black, with a bluish cast. On treating these aforesaid brown-violet shades with copper sulfate they become violet or dark violet, respectively. On reduction with stannous chlorid and hydrochloric acid my new coloring-matter yields 1.2-amido-naphthol and an amido-naphthol-mono-sulfo-acid, which acid I regard as 2.1-amido-naphthol-5-sulfo-acid. The free acid of the coloring-matter is difficultly soluble in cold water, more readily soluble in boiling water, yielding a claret-red solution. The sodium salt is soluble in water with a blue color, which on the addition of sufficient caustic soda becomes violet. The solution of the free acid of the coloring-matter in concentrated sulfuric acid (containing about ninety-six per cent. of $H_2SO_4$) is violet.

The following example will serve to illustrate a method of carrying out my invention; but the invention is not necessarily limited to this example nor to the conditions described therein. The parts are by weight.

Example: Diazotize two hundred and fifty-seven and a half ($257\frac{1}{2}$) parts of 1-chlor-2-naphthylamin-5-sulfo-acid, or three hundred and twenty-five (325) parts of the mono-sodium salt of 2-naphthylamin-1.5-disulfo-acid in the usual manner. Add to the diazo solution or suspension so obtained sufficient sodium carbonate to neutralize the excess of mineral acid employed and also the sulfo group or groups contained in the diazo-naphthalene sulfo-acid, and then add more soda, so that an excess of one to two molecular proportions thereof is present. Allow the mixture to stand for about twelve (12) hours at a temperature of twenty (20°) degrees centigrade or for about one (1) hour at a temperature of from fifty (50°) to sixty (60°) degrees centigrade. The formation of the new diazo compound should then be finished and may be recognized by the fact that the yellowish or yellowish-red solution which results does not easily combine with resorcin at a temperature of 0° centigrade, but combines with it on gently heating or on standing for some time at a temperature of about 20° centigrade, giving rise to the formation of a blue-violet coloring-matter. When this stage is reached, add a concentrated solution of from about one hundred and eighty (180) to two hundred (200) parts of beta-naphthol dissolved with the aid of the necessary quantity of caustic soda and warm while stirring for about five (5) hours at a temperature of from thirty-five (35°) to eighty (80°) degrees centigrade. The excess of beta-naphthol employed accelerates combination, but is not absolutely necessary. The resulting coloring-matter is for the most part in solution, from which it can be precipitated by the addition of common salt. Filter it off and, if necessary, purify it by dissolving it in water and reprecipitating by means of common salt.

Now, what I claim is—

The coloring-matter obtainable by means of diazotized 1-chlor-2-naphthylamin-5-sulfo-acid, carbonate of soda, and beta-naphthol, which dyes wool brown-violet shades, which shades on treatment with potassium bichromate and acetic acid become black-blue to black and on treatment with copper sulfate violet, which on reduction with stannous chlorid and hydrochloric acid yields 1.2-amido-naphthol and an amido-naphthol-mono-sulfo-acid, which coloring-matter in the form of its free acid yields with hot water a claret solution, and with concentrated sulfuric acid a violet solution, whose sodium salt is soluble in water yielding a blue solution, which solution on the addition of caustic soda becomes violet.

In testimony whereof I have hereunto set my hand in the presence of two subscribing witnesses.

PAUL JULIUS.

Witnesses:
ERNEST E. EHRHARDT,
JACOB ADRIAN.